3,646,147
TWO-PHASE IODIDE-CATALYSED SYSTEM FOR
PREPARING TERTIARY AMINES
Zaven A. Dadekian, Suffern, N.Y., assignor to Baird
Chemical Industries, Inc., New York, N.Y.
No Drawing. Continuation of application Ser. No.
617,805, Feb. 23, 1967. This application Mar. 18,
1970, Ser. No. 19,533
Int. Cl. C07c 85/04
U.S. Cl. 260—583 R                     13 Claims

ABSTRACT OF THE DISCLOSURE

Tertiary amines are prepared by reacting an alkyl chloride with a lower amine in a two-phase system using an ammonia or alkali metal iodide catalyst.

This application is a continuation of U.S. patent application Ser. No. 617,805, filed Feb. 23, 1967, now abandoned.

This invention relates to a new and improved process for the preparation of tertiary amines. More specifically, the invention teaches the preparation of these amines by the iodide catalyzed reaction of a primary amine, and long-chain alkyl chloride, e.g., dodecyl chloride.

The tertiary amines of the invention are useful for metallurgical applications, such as, the extraction of salts of uranium, zirconium and other valuable metals and as an intermediate for the formation of other chemicals, particularly, quaternary ammonium compounds. These latter compounds are used for secondary oil recovery, textile softeners, corrosion inhibitors, among other things.

The direct synthesis of tertiary amines by the reaction of two moles of a high molecular weight alkyl chloride with lower primary amine has never become commercially important despite the apparent simplicity of the reaction and favorable economics. Dialkylation of the primary amine with high molecular weight materials is difficult because of the low activity of both reactants. This reaction must be distinguished from the more facile reaction with the alkyl halide and more reactive low molecular weight secondary amines. Preparing tertiary amines via this route also difficult because of the stearic hindrance and low reactivity of the high molecular weight secondary amine intermediate, which must be further reacted to form the tertiary amines. Although some yield of each of the secondary and tertiary amines can be expected under severe conditions, only a quantitative yield of the tertiary is commercially attractive.

The reaction of the primary amine with alkyl chlorides from the economic viewpoint presents the most attractive route for the formation of lower alkyl higher dialkyl amines. Little success, however, has been had with this reaction because of the relatively low activity of these reactants prevents the formation of quantitative yields of the tertiary amines under the desired temperature and pressure conditions and at adequate reaction rates.

Surprisingly, it has been discovered that long-chain alkyl chlorides can be reacted with lower primary amines with substantially quantitative yields of a trialkylated product having outstanding color properties, if the reaction is performed in the presence of catalytic amounts of a soluble iodide, such as, potassium iodide.

Preferably, the reaction is carried out in a two-phase system. The first phase is the heavier phase and is water and/or a low molecular weight alcohol having from 1 to 6 carbon atoms, preferably, isopropanol. It is in this phase that the iodide catalyst is soluble. The second phase is the lighter phase and is initially composed of the alkyl chloride. As the reaction proceeds the upper phase is converted primarily to the tertiary amine and contains small amounts of unreacted chloride and by-product alcohol from hydrolysis. The latter materials are readily stripped from the product. In the bottom phase, the salt formed is either dissolved or slurried, depending on the amount of water present. Generally, from ⅓ to 3 parts of the heavy phase are present for each part of the alkyl halide reacted depending on the molecular weight of the reactants and the amount of slurried salt that can be readily handled by the equipment.

The use of the low molecular weight alcohol is particularly desirable to minimize hydrolysis of the alkyl halide.

The use of the alcohol without any water, while feasible, is not generally advantageous because it limits the alkaline materials which can be used for neutralization to those which are alcohol soluble. On the other hand, the addition of alkaline materials in water solution is certainly tolerable without excessive hydrolysis and is much easier and less expensive. The use of an all water system has the advantage that phase separation is easier, since the by-product salt is soluble in the water phase. The disadvantage is that some hydrolysis of the alkyl chloride reactant takes place with resultant loss of yield.

The overall reaction of the invention may be summarized as follows:

$$2RX + R'NH_2 \rightarrow R_2R'N + 2HX$$

where R is an alkyl group having from 6 to 22 carbon atoms, preferably from 8 to 18. It may be straight or branched with an odd or even number of carbon atoms. R' may be a lower alkyl or an aralkyl said alkyl groups having from 1 to 4 carbon atoms, preferably, 1 or 2. Additionally, the carbon atoms of the alkyl groups may have interposed therein or attached thereto an oxygen atom. The radicals formed thereby include hydroxyalkyl and alkyl ethers. The primary amine reacts initially with the alkyl halide to form a secondary amine; and, the secondary amine reacts with still another mole of the halide to form the product tertiary amine.

Since two moles of the alkyl halide reacts for each mole of the primary amine, it is desirable to add the reactants in substantially this ratio. For best product quality a slight excess, up to 10%, of the alkyl chloride is used.

Preferably, an alkaline material is added during the reaction in order to convert any amine hydrohalide formed in the course of the reaction back to the free intermediate amine which can be further reacted and to neutralize the hydrogen chloride. The alkaline material is added after the reaction is underway, most desirably at a controlled rate, so that the reaction medium does not become strongly basic. High alkalinity favors hydrolysis of the alkyl chloride to the alcohol and is therefore undesirable.

The alkaline materials which may be employed are the soluble inorganic strong bases such as metal hydroxides, carbonates and bicarbonates, and, also gaseous ammonia and the basic metal oxides and salts. Such materials may be readily selected by those skilled in the art. Preferred materials are the alkali metal, alkaline earth metal and ammonium hydroxides. These include sodium hydroxide, potassium hydroxide and calcium hydroxide. As a matter of convenience these materials may be added to the reaction mass as a 10 to 50% aqueous solution.

Sufficient alkaline material is employed to neutralize the amine hydrochloride formed in the reaction. A slight molar excess is advantageous to insure that no amine hydrochloride is left unconverted.

By the end of the reaction, at least two moles of the alkaline material for each mole of the tertiary amine formed is added with perhaps up to 10% excess.

The alkyl chlorides include n-octyl chloride, dodecyl chloride, tridecyl chloride, heptadecyl chloride, octadecyl chloride, and eocyl chloride. Examples of the tertiary amines formed by the reaction are dinonylmethylamine; diundecylethylamine; dipentadecylethanolamine; dilaurylmethylamine; distearylmethylamine; dioctylethylamine; didecylmethylamine; ditetradecylethoxyethylamine; and diheptylamine. Commercially significant products are the tertiary amine formed by combination of octyl and decyl chlorides and of cetyl and stearyl and of the chloride having the alkyl distribution of coconut oil. It should be understood that other mixtures of alkyl chlorides can be used in the process.

Examples of the primary amines are methylamine, ethylamine, n-propylamine, iso-propylamine, n-butylamine; ethanolamine, benzylamine and hydroxyethyl aminoethyl ether.

The reaction temperature is broadly from 80° C. to 200° C., preferably from about 140 to 180° C. Reaction times of from 2 hours to 24 hours are required to complete the reaction. Generally, less than 12 hours is required. The temperatures and reaction times are a function of molecular weight of the alkyl chloride, the lower molecular weight materials requiring lower temperatures and less reaction time. Branched chain alkyl chlorides require higher temperatures and more reaction time than straight chain alkyl chlorides with corresponding molecular weight. Pressure must be adequate to maintain the reactants in the liquid phase.

Examples of the soluble iodide catalysts of the invention are ammonium iodide and the alkali metal iodides, e.g., potassium and sodium iodide. The particular cation is only important in order to provide the iodide ion in solution. The iodide ion is the effective catalytic material. From about 0.5% to 5% of the catalyst is employed based on the weight of tertiaryamine, preferably from ½% to 2%.

After the completion of the reaction, the organic phase is composed substantially of the tertiaryamine and isopropanol and the water phase contains salt. The bottom phase of the reactor contents is "cut" to another vessel. The organic phase is washed with a 50% caustic solution and stripped under vacuum to eliminate isopropanol and fatty alcohol hydrolysis products In order to more fully describe the invention, attention is directed to the following examples:

EXAMPLE 1

A four gallon autoclave is loaded with 8120 grams (40 moles) of lauryl chloride, 3520 grams (44 moles NaOH) of 50% sodium hydroxide, and 73 grams of potassium iodide. Air is expelled by vacuum and 620 grams (20 moles) of monomethylamine are introduced. The batch is heated to 160° C., for 9 hours. After cooling the autoclave to about 120° C., the two phases are separated and the upper phase vacuum stripped. Analysis of the final product shows the formation of 96.5% of dilauryl methyl amine and 0.5% secondary amine. The equivalent weight of the product is 373 and the Gardner color is 2.

EXAMPLE 2

In a four gallon autoclave, 8800 grams (50 moles) of decyl chloride are admixed with 78 grams of potassium iodide, 4400 grams of 50% aqueous caustic (55 moles NaOH) and an additional 100 grams of water. Thereafter, 775 grams (25 moles) of monomethylamine is charged. The batch is heated at 165° C. overnight. The materials are separated as described in Example 1. The product is analyzed and found to contain 95.2% of didecyl methylamine and 0.1% of secondary amines. The equivalent weight is 324 and the APHA color 150.

EXAMPLE 3

Using a one gallon autoclave 1783 grams (12 moles) of octyl chloride are reacted with 186 grams (6 moles) of monomethylamine in the presence of 15 gram potassium iodide and 1056 grams of 50% aqueous caustic (13.2 moles NaOH). The reaction continues for 4 hours at a temperature of 165° C. After the separation and purification analysis shows a product of 96.1% tertiary and 0.2% secondary amine. The equivalent weight is 265 and the APHA color is 60.

EXAMPLE 4

Substituting a 50—50 mixture of octyl chloride and decyl chloride for the octyl chloride of Example 3 the run was repeated. The product contained 95.9% of tertiary and 0.8% secondary amine was obtained. The equivalent weight is 294.

It should be understood that the above examples are illustrative only and not intended to limit the invention.

I claim:
1. A process for the formation of a tertiary amine which comprises reacting an alkyl chloride having from 8 to 18 carbon atoms with a primary amine having an organic radical which is a lower alkyl, a lower hydroxyalkyl, a lower alkyl ether, or a benzyl group in a two-phase system wherein the first phase is said alkyl chloride and the second phase is water and/or a low molecular weight alcohol in the presence of an ammonium or an alkali metal iodide catalyst at a temperature of from 80 to 200° C., neutralizing the amine hydrochloride formed during the reaction with an alkaline material, thereby forming said tertiary amine reaction product.

2. A process for the preparation of a tertiary amine which comprises: reacting an alkyl chloride having from 6 to 22 carbon atoms with a lower amine having an organic radical which is a lower alkyl, a lower hydroxyalkyl, a lower alkyl ether or a benzyl group in a two-phase system wherein the first phase is said alkyl chloride and the second phase is water in the presence of 0.1 to 5% by weight, based on tertiary amine, of an ammonium or an alkali metal iodide catalyst, whereby the alkyl group of said alkyl chloride are substituted for the N-hydrogens of said lower amine, at a temperature of from 80 to 200° C., and recovering from the reaction mixture a tertiary amine.

3. The process of claim 1 wherein said iodide catalyst is an alkali metal iodide.

4. The process of claim 2 wherein said alkali metal iodide is potassium iodide.

5. The process of claim 1 wherein said second phase is water.

6. The process of claim 1 wherein said second phase is water and isopropanol.

7. The process of claim 1 wherein said alkyl chloride is decyl chloride.

8. The process of claim 1 wherein said alkyl chloride is octyl chloride.

9. The process of claim 1 wherein an alkaline material is added during the reaction.

10. The process of claim 9 wherein the alkaline material addition is controlled so as to avoid the presence of excess of the free alkaline material during the reaction.

11. The process of claim 2 wherein the amine hydrochloride formed during the reaction is neutralized with an alkaline material.

12. The process of claim 11 wherein the alkaline material is caustic.

13. The process of claim 2 wherein the molar ratio of amine to alkyl chloride is slightly in excess of the stoichiometric amount.

(References on following page)

References Cited

UNITED STATES PATENTS

| | | | |
|---|---|---|---|
| 2,040,396 | 5/1936 | Morrell et al. | 260—585 A X |
| 2,172,822 | 9/1939 | Tamele et al. | 260—583 |
| 2,304,637 | 12/1942 | Hardy | 260—585 A X |
| 2,040,396 | 5/1936 | Morrell et al. | 260—585 A X |
| 2,172,822 | 9/1939 | Tamele et al. | 260—583 |
| 2,268,620 | 1/1942 | Rigsby | 260—585 A X |
| 2,304,637 | 12/1942 | Hardy | 260—585 A X |
| 3,169,995 | 2/1965 | Roy et al. | 260—585 A |

CHARLES B. PARKER, Primary Examiner

R. L. RAYMOND, Assistant Examiner

U.S. Cl. X.R.

260—570.9, 584 R, 584 C, 585 A